(No Model.) 2 Sheets—Sheet 1.

N. C. BASSETT.
ELECTRIC MOTOR FOR RAILWAY CARS.

No. 527,927. Patented Oct. 23, 1894.

WITNESSES.
Alec F. Macdonald
A. L. Orne

INVENTOR.
Norman C. Bassett
by Bentley & Blodgett.
Attys.

(No Model.) 2 Sheets—Sheet 2.
N. C. BASSETT.
ELECTRIC MOTOR FOR RAILWAY CARS.
No. 527,927. Patented Oct. 23, 1894.
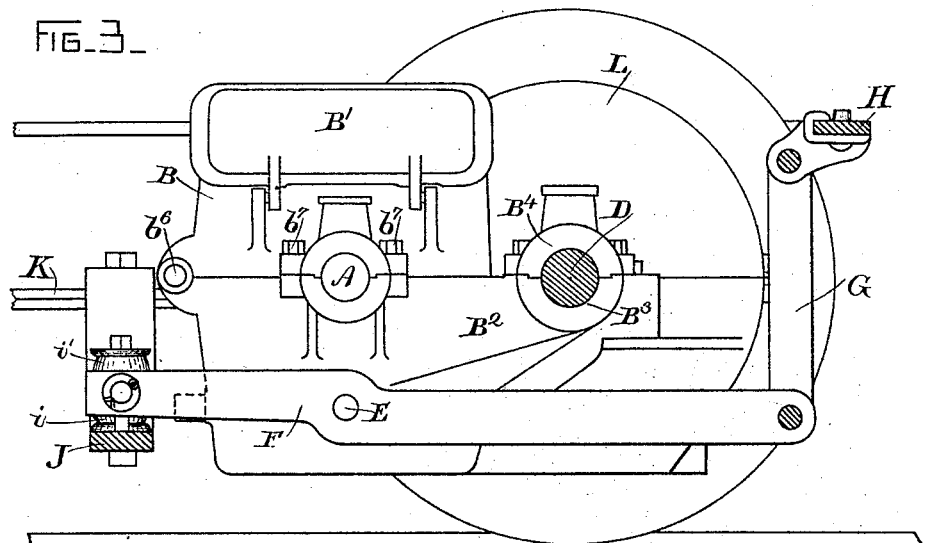
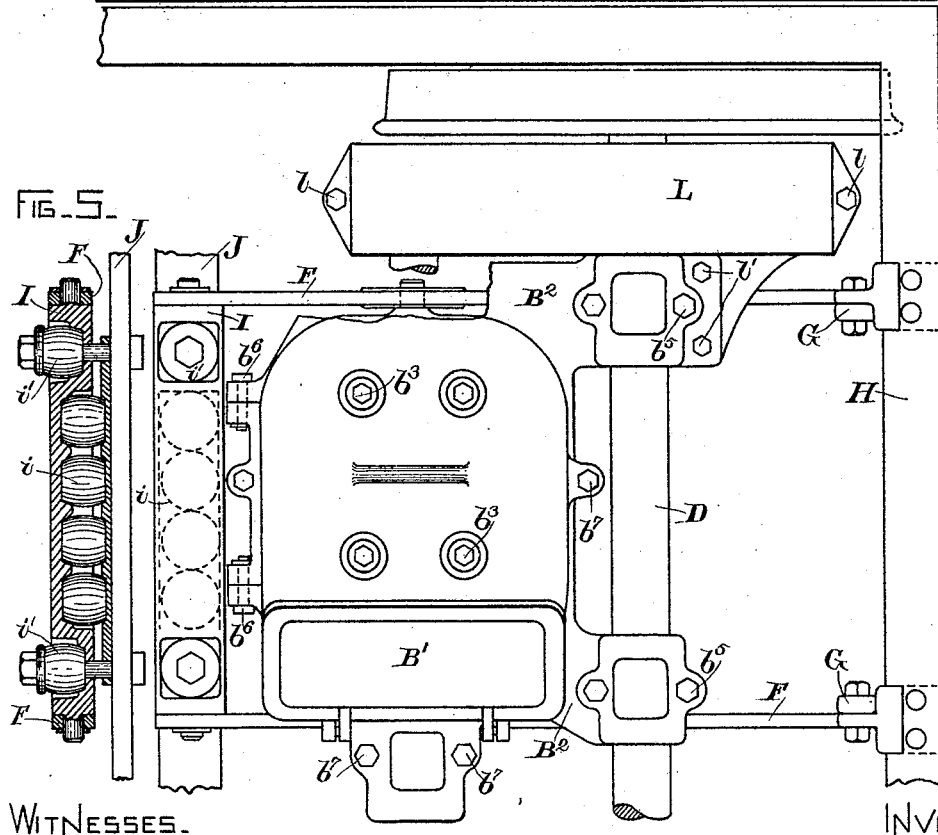
WITNESSES.
Alec F. Macdonald.
A. L. Orne
INVENTOR.
Norman C. Bassett
by Bentley & Blodgett
Attys.
THE NORRIS PETERS CO., PHOTO-LITHO., WASHINGTON, D. C.

UNITED STATES PATENT OFFICE.

NORMAN C. BASSETT, OF LYNN, ASSIGNOR TO THE GENERAL ELECTRIC COMPANY, OF BOSTON, MASSACHUSETTS.

ELECTRIC MOTOR FOR RAILWAY-CARS.

SPECIFICATION forming part of Letters Patent No. 527,927, dated October 23, 1894.

Application filed June 28, 1893. Serial No. 479,027. (No model.)

*To all whom it may concern:*

Be it known that I, NORMAN C. BASSETT, a citizen of the United States, residing at Lynn, in the county of Essex and State of Massachusetts, have invented certain new and useful Improvements in Electric Motors, of which the following is a specification.

My invention relates to dynamo electric machines, its object being to provide a light, compact and readily accessible water-proof motor especially adapted for use in railway work.

My invention further relates to improved methods for mounting such a motor upon a railway truck.

Figure 1:
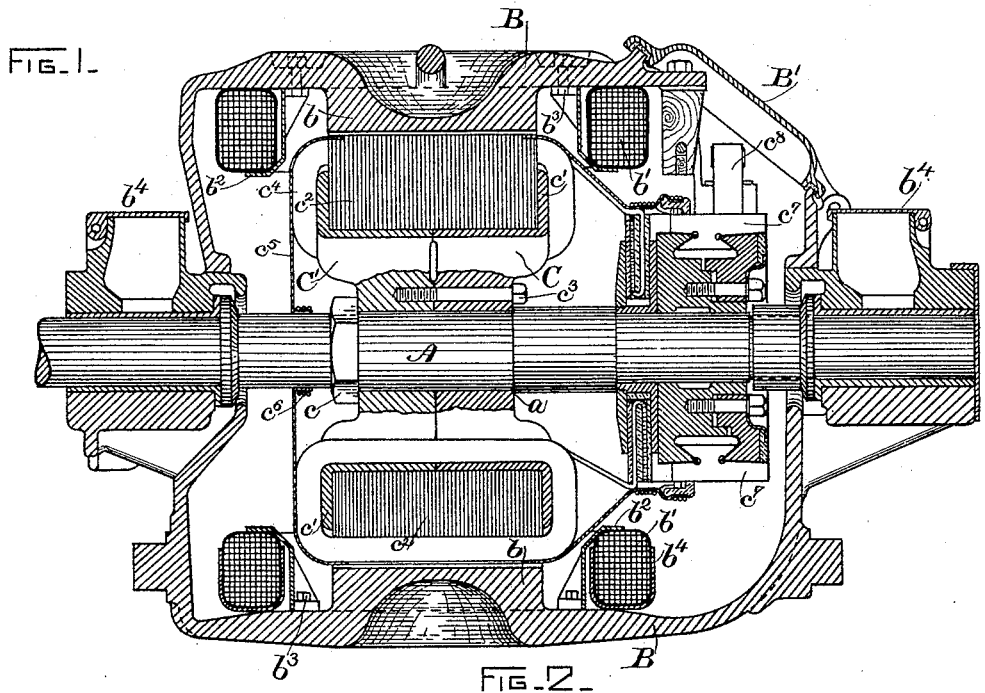
Figure 2:
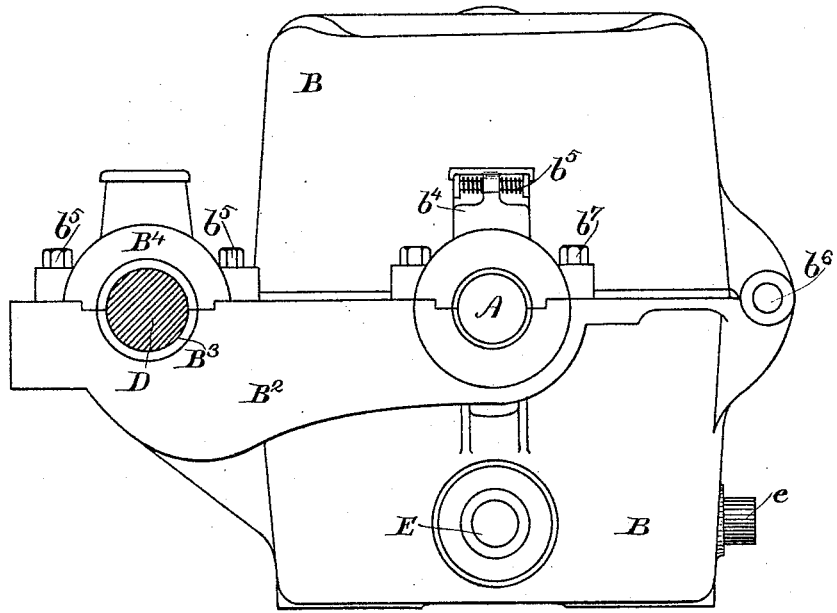

In the accompanying drawings, Figure 1 is a cross section of the motor on the line of the armature shaft. Fig. 2 is an end elevation of the motor. Fig. 3 is an end elevation of the motor showing the method of mounting the same on the truck. Fig. 4 is a top plan view of the motor showing the gear case and a portion of the truck. Fig. 5 is a detail showing the method of supporting the yokes which sustain the motor.

Referring to Fig. 1 the armature shaft A is journaled in suitable bearings between, on or attached to the box shaped casings B which form a practically water-proof outside shell for the motor. The said casings are provided on their inner surfaces with polar extensions $b$ around which are placed the coils or bobbins $b'$. Other extensions, not shown, ninety degrees from said extensions $b$, form consequent poles, and have no windings. The coils $b'$ are held in place by brackets $b^2$ of cast iron or other suitable material bolted to the inner side of the top and bottom casings respectively by the bolts $b^3$ shown in Figs. 1 and 4. The lower coil is further provided with a trough shaped sheathing $b^4$ which extends around and under the coil so as to protect it from water or dirt which may possibly get inside the inclosing shell of the motor.

The armature spider is made up of two sections C C' keyed to the shaft A and secured thereon by the nut $c$, which forces it up against a shoulder $a$ on the shaft provided for that purpose. These two sections are provided with flanges $c'$ between which the laminæ $c^2$ forming the armature core are packed, and they are held together by cap-screws $c^3$. The armature core is of the notched type and coils $c^4$ are wound thereon through the notches. Around the end of the armature away from the commutator is placed a covering $c^5$ of oiled silk or other water proof material drawn tight and fastened at its ends to the outer face of the armature core and to the shaft, respectively, by a wrapping of tape or cord, as is indicated at $c^6$. At the commutator end of the armature a similar covering is provided, also fastened by tape or cord and attached at its outer end to the outside of the commutator $c^7$, instead of the shaft A. In this manner the armature is entirely inclosed and protected against water or other foreign substances, which may find their way into the inclosing shell of the motor.

Upon the upper casing B is hinged a lid B' opening directly over the commutator brushes $c^8$ so that the commutator and inside of the motor are rendered readily accessible.

Oil cups $b^4$ are provided in the upper casing B and have hinged lids normally held closed by a coil spring $b^5$ shown in Fig. 2.

The lower casing of the motor is provided with two lugs or extensions B² provided with half bearings B³ to fit the lower half of the car axle D. Caps B⁴ fitting the upper half of said car axle are secured to said lugs B², by cap-screws $b^5$ so that the said lower casing is sleeved upon the car axle independently of the upper casing. The said upper casing is secured to the lower casing by hinges $b^6$ at the end opposite said lugs B², and by cap-screws $b^7$ at the sides of the armature shaft and end of the casing opposite said hinges.

In mounting the motor trunnions E are provided on each side of the lower casing, vertically in line with the center of gravity of the motor, and these trunnions are supported by yokes F pivoted at one end to the downwardly hanging arms or links G which in turn are pivoted to the cross piece H of the truck frame. The other ends of said yokes are supported upon corresponding trunnions at the opposite ends of a cross piece I which rests upon rubber cushions $i$ supported upon a cross bar J of the truck frame which is carried by longitudinal supports K fastened to the journal boxes of the car wheels. Other rubber cushions $i'$ bear against the upper portion of the cross piece I to take up the upward jar of the motor. By this construction, best shown in Fig. 3, substantially the entire weight of the motor concentrated, as it were, at the trunnions E, is supported upon the supplementary frame which is rendered flexible by its pivoted joints and its cushioned support upon the cross bar J. The extensions $B^2$ are thus practically relieved of the weight of the motor and merely serve to keep the gears in mesh, and the motor balanced on its pivotal supports.

A gear case L made in two parts and fastened together by bolts $l$ as shown in Fig. 4, is fastened to one of the lugs $B^2$, above described, by means of the bolts $l'$. The upper casing B is provided with an opening directly over the commutator which is normally covered by the lid $B'$, and said lid $B'$ is firmly held closed by a suitable spring. The said opening is amply large to give access to the commutator brushes and to that portion of the inner part of the motor case which is under the commutator so that said parts can be readily inspected and cleaned. The lower casing B of the motor is made entirely in one piece with no openings, so that there is very slight possibility of water or dirt getting inside, and the lower coils are amply protected from the slight amount of external matter which may leak in by the sheathing $b^4$.

The method of supporting the motor which I have adopted, and which forms part of my present invention, is of especial advantage when it becomes necessary to take the motor apart and remove the coils, the armature, or any other of the working parts, for repairs or renewal. The motor when placed over the pit, which it is customary to provide for that purpose under the tracks of the repair shop, may be let down by removing the yokes F from the trunnions at the ends of the cross piece I so that the motor itself is permitted to swing round the car axle D until it is directly beneath said car axle, and then by removing the bolts $b^7$ the upper casing of the motor case may be swung upon its hinges $b^6$ so that the whole casing is open and accessible but supported upon the axle by the lower casing sleeved thereon. An additional trunnion $e$ best shown in Fig. 2 is provided upon the lower casing at the free end of the motor so that if desired the motor can be supported directly upon said trunnion by means of the said cross piece, which may be adapted to receive the same without the use of the yokes F and downwardly hanging links G.

What I claim as new, and desire to secure by Letters Patent, is—

1. The combination with an electric motor centered upon an axle of the vehicle, of trunnions upon the outside of the motor vertically in line with its center of gravity, and longitudinal yokes supported by the wheel-base of the vehicle to which yokes said trunnions are pivotally connected.

2. An electric motor centered on an axle of the vehicle and having a supplementary support at a point vertically in line with its center of gravity, said support consisting of side bars supported at one end by a transverse cross bar, and at the other end by links pivoted to a cross bar on the opposite side of the axle.

3. The combination with an electric motor centered on an axle of the vehicle, of a longitudinal supporting bar therefor carried at one end by the truck frame on one side of the axle, and at the other end by a link pivoted to the truck frame on the opposite side of the axle, and a pivotal connection between the motor and the said longitudinal bar vertically in line with the center of gravity of the motor.

4. An electric railway motor sleeved upon a car axle, but mainly supported by a supplementary frame pivotally connected at one end to the main truck, and spring supported at the other end upon a cross piece suspended from said main truck, as described.

5. An electric railway motor supported by a supplementary frame consisting of yokes extending longitudinally along the sides of said motor and suspended from the main truck frame, said motor being connected to said yokes at points below its center of gravity and prevented from swinging around said points by extensions sleeved upon the car axle, as described.

6. In an electric motor having an inclosing shell made of an upper and lower casing hinged and bolted together, trunnions on opposite sides of said lower casing, longitudinal extensions from said lower casing sleeved upon the car axle, and yokes suspended from the main truck adapted to support said trunnions but readily removable therefrom so that the motor can be allowed to swing beneath the axle and be suspended therefrom in an accessible position, and held by said longitudinal extensions, as described.

7. A waterproof motor comprising two casings hinged together at one end and sleeved upon a car axle at the other, trunnions upon opposite sides of said casings below the center of gravity of said motor, yokes supporting said trunnions, said yokes being pivotally supported near the axle end of the motor and spring-supported near the free end thereof, as described.

8. An electric railway motor comprising a lower box-shaped casing sleeved at one end upon the car axle and supported by trunnions on its sides below the center of gravity of the motor, said trunnions resting in spring-supported yokes, an upper box-shaped casing hinged to said lower casing at the end away from the car axle and bolted thereto near said axle, thereby forming a substantially water-tight inclosing shell, an armature within said inclosing shell and journaled between said casings, and polar extensions upon the inner surface of said casings adapted to receive bobbins and form the field magnets of the motor, substantially as described.

9. An electric motor geared to and centered upon a car axle, and supported upon a supplementary frame pivotally connected at one end to the truck, and spring-supported at the other end, as set forth.

10. An electric motor pivotally connected at points in line with its center of gravity to longitudinal yokes supported by the truck, and extensions from said motor sleeved upon the car axle, as and for the purpose described.

11. An electric motor comprising a lower casing sleeved upon an axle of the vehicle and flexibly supported by the truck, an upper casing hinged to said lower casing, but not extending to the car axles, an armature journaled in the said casing, and extensions on the inner wall of said casing forming the field magnet poles of the motor, as set forth.

12. An electric motor provided with a casing and extensions therefrom for centering the motor upon an axle of the vehicle, supporting devices for the said casing vertically in line with the center of gravity of the motor, and an additional supporting device on the end of the casing opposite the said extensions.

In testimony whereof I have hereunto set my hand this 27th day of June, 1893.

NORMAN C. BASSETT.

Witnesses:
JOHN W. GIBBONEY,
BENJAMIN B. HULL.